Patented June 7, 1938

2,119,957

UNITED STATES PATENT OFFICE 2,119,957

PRODUCTION OF HYDROCARBON RESINS

Thomas F. Nealon, Boston, Mass., assignor to Monsanto Chemical Company, St. Louis, Mo., a corporation of Delaware No Drawing. Application November 18, 1936, Serial No. 111,399

6 Claims. (Cl. 260—2)

The present invention relates to synthetic resins produced from unsaturated hydrocarbons and to methods of producing such resins, and it has as its object the provision of improved resins and an improved method of producing such resins.

The method of producing hydrocarbon resins by treatment of cracked petroleum distillates with anhydrous aluminum chloride and similar Friedel-Crafts catalysts is described in numerous patents, for example, that granted to Charles A. Thomas and Carroll A. Hochwalt, No. 1,836,629, dated December 15, 1931. In such processes the aluminum chloride or other acid-reacting catalyst is removed by decomposition with a stoichiometrical proportion of a water-soluble alkali or ammonia in solution in alcohol, acetone, or other organic hydroxy compound. This decomposition treatment destroys any complex compounds or addition products which may have been formed between the hydrocarbons and the catalyst and precipitates the catalyst as solids insoluble in the reaction mixture.

It has been discovered that much of the variation in resins produced by the processes described is attributable directly to the method of removing the catalyst from the mixture after treatment of the cracked distillate therewith. This variation is manifest in such properties as color and solubility. Coatings deposited from varnishes made from resins of such variability will differ in regard to stability to light, resistance to weathering, and general durability.

In my co-pending application, Serial No. 89,662, filed on July 8, 1936, which has issued as Patent No. 2,101,558, a process is described wherein these disadvantages are overcome by destroying the catalyst in the usual manner with, for example, an alcoholic solution of sodium hydroxide; thereafter the resulting mixture is slightly but definitely acidified with a dilute solution of sulfuric acid and to the mixture is subsequently added an alkaline solid insoluble in the reaction mixture, such as sodium carbonate, in quantity in excess of that required to neutralize the sulfuric acid.

According to the present invention, this neutralizing or catalyst-decomposing procedure is greatly simplified and improved in several respects. The procedure of the present invention consists in neutralizing the aluminum chloride, or similar Friedel-Crafts or acidic polymerizing catalyst with a suspension of calcium hydroxide in an alcohol. The reaction mixture is neutralized completely by adding an excess of such a suspension. By this procedure the necessity for accurate stoichiometrical control of the quantity of neutralizing alkali solution that is added to the polymerized hydrocarbon mixture is avoided. The number of operations to obtain complete substantial neutrality is reduced to one simple operation. No undesirable products are introduced into the resin should slight variations occur in the neutralization treatment. Calcium hydroxide itself is one of the cheapest of bases. Whereas the decomposed catalyst and other insoluble products in the reaction mixture have occasionally been difficult to separate by filtration, the catalyst as decomposed by the present invention, is in such a form or condition in the reaction mixture that subsequent filtration difficulties are completely obviated and therefore other expedients which have been adopted in the past to aid in the filtration can be largely dispensed with.

Although certain of the phenomena observed in the practice of the invention are inexplicable; for example, there is no precise explanation to account for the difference between the types of precipitates resulting from the different methods of decomposing the catalyst; some of the principles upon which the invention is based and which have been found to obtain in fact will aid to a clearer understanding of the invention. These explanations are not advanced by way of limitation but merely to indicate the manner in which the invention may be modified in practice and to adapt it to more extended use.

When calcium hydroxide or slaked lime is added to a hydrocarbon reaction mixture containing aluminum chloride or similar acid catalyst it is without substantial effect on the catalyst. If an excess of aqueous solution of calcium hydroxide or a suspension of calcium hydroxide in water is added to a hydrocarbon mixture containing aluminum chloride some incomplete decomposition of the catalyst takes place but, if sufficient excess is added to produce complete decomposition of the catalyst, the resin resulting from such decomposition contains calcium salts and the precipitated solids are difficult to filter. If only a stoichiometrical quantity of aqueous calcium hydroxide solution is added, the solution forms an emulsion with the hydrocarbon mixture and is in such form that the catalyst is not decomposed completely. An aqueous solution of sodium hydroxide behaves in much the same manner but if the sodium hydroxide is dissolved in a solvent such as alcohol, which solvent is miscible with the hydrocarbon mixture, the formation of emulsions is avoided and the alkali is brought into intimate contact with the catalyst. Calcium hydroxide is not sufficiently soluble in alcohol, hence cannot be used in this manner. But, as previously stated, even with stoichiometric quantities of a base dissolved in a solvent that is miscible with the hydrocarbon mixture, sufficient variation occurs in the neutralization treatment to produce variations in the resin.

The present invention is based on the discovery that in a suspension of calcium hydroxide in an aqueous mixture of a water-soluble alcohol or ketone, the calcium hydroxide is dissolved to a sufficient extent in the aqueous organic solvent to bring about decomposition of the catalyst and yet, even though an excess of such a suspension is used, there is not enough calcium hydroxide in solution to have any deleterious effect on the resin. Therefore, if in practice it is observed that the catalyst is not being sufficiently decomposed by such a suspension of calcium hydroxide in an aqueous alcohol (or ketone), the proportions of the organic solvent and water may be adjusted in either of two manners, viz., to bring about slightly greater solution of the calcium hydroxide in the solvent or to bring about greater solubility of the solvent in the hydrocarbon mixture. The adjustment is not critical, that is, a considerable range of solvent-water ratio can be used in any particular case but the optimum ratio will vary with the particular alcohol or ketone.

Obviously in place of calcium hydroxide, suspensions of similar alkaline-earth hydroxides may be used; for example, barium hydroxide, but the calcium hydroxide possesses the advantage of cheapness. The organic solvents which may be dissolved and used with water as media in which to suspend the calcium hydroxide include methyl, ethyl, isopropyl and n-propyl alcohols, as well as other water-soluble alcohols, acetone, methyl ethyl ketone, etc. However, from considerations of the character of the precipitated solids, isopropyl alcohol is preferred.

Examples of the method of practicing the invention follow.

*Example I.*—A water-free, highly cracked petroleum distillate boiling below 200° C., having a specific gravity of 0.813 at 20° C., and rich in aromatics, diolefins and olefins is polymerized substantially as described in U. S. Patent 1,836,629, referred to above, with 1.5% by weight of anhydrous aluminum chloride, over a period of three hours. This polymerized mixture is used throughout the examples.

To a portion of the polymerized mixture is added a suspension prepared by adding 30 grams of calcium hydroxide (commercial slaked lime of U. S. P. quality) to a mixture of 35 cc. of methyl alcohol and 30 cc. water. The suspension is added in such quantity that an excess, preferably double the quantity required to neutralize the aluminum chloride, is present. A larger excess is not deleterious to the subsequent operations or to the quality of the resin. The mixture is stirred continuously for 15 minutes or more, allowed to settle, and then filtered. The precipitate in this case is of such character that filtration with suction on the filtrate side of the filter or slight positive pressure on the side of the liquid to be filtered is rapid and the filtrate is neutral to litmus. From the filtrate, resin is recovered in the usual manner.

*Example II.*—To a portion of the polymerized mixture used in Example I is added an excess of a suspension prepared by adding 35 grams of calcium hydroxide in a mixture of 40 cc. of isopropyl alcohol and 10 cc. of water. Approximately 50 cc. of this suspension is ample excess for one liter of the polymerized mixture. The polymerized mixture and the lime suspension are stirred for 30 minutes, during which time the precipitate coagulates. The mixture is filtered as before, with suction or slight pressure, and the filtrate is treated for recovery of resin in the usual manner. If the filtrate becomes cloudy during evaporation, this can be corrected by adding a small additional quantity of a suspension of lime in isopropyl alcohol or a suspension of lime in methyl alcohol and filtering once more.

It is to be understood that inasmuch as the hereinabove description contains preferred embodiments of the invention, such modifications and substitutions which are made therein to adapt it to specific applications do not depart substantially from the spirit of the invention, which is defined in the appended claims.

What I claim is:

1. In the manufacture of hydrocarbon resins by polymerization of a cracked hydrocarbon distillate rich in unsaturated hydrocarbons including diolefins, by means of a Friedel-Crafts polymerizing agent, the steps in the recovery of the resin characterized in that the catalyst is completely neutralized and converted into inert products of reaction by means of a suspension of an alkaline-earth hydroxide in a solvent consisting of water and a substance miscible therewith selected from the group consisting of water-soluble alcohols and ketones.

2. The method as defined in claim 1 and further characterized in that the alkaline-earth hydroxide is calcium hydroxide.

3. The method as defined in claim 1 and further characterized in that the water-soluble alcohol is isopropyl alcohol.

4. The method as defined in claim 1 and further characterized in that the suspension is calcium hydroxide in a mixture of isopropyl alcohol and water.

5. The method as defined in claim 1 and further characterized in that the water-soluble alcohol is methyl alcohol.

6. The method as defined in claim 1 and further characterized in that the suspension is calcium hydroxide in a mixture of methyl alcohol and water.

THOMAS F. NEALON.